United States Patent [19]
Albertson
[11] Patent Number: 4,620,613
[45] Date of Patent: Nov. 4, 1986

[54] SELF-CLOSING SAW HORSE

[76] Inventor: Carl N. Albertson, R.R. #2-Box 90, Staatsburg, N.Y. 12580

[21] Appl. No.: 764,757
[22] Filed: Aug. 12, 1985
[51] Int. Cl.[4] ........................ B27B 21/00; F16M 11/00
[52] U.S. Cl. .................................... 182/153; 182/181; 182/225
[58] Field of Search ........ 182/153, 186, 226, 181-185, 182/225

[56] References Cited

U.S. PATENT DOCUMENTS

| | | | |
|---|---|---|---|
| 861,583 | 7/1907 | Foster | 182/176 |
| 2,399,861 | 5/1946 | Evans | 182/153 |
| 2,427,679 | 9/1947 | Larson | 182/153 |
| 3,045,777 | 7/1962 | Dintelmann | 182/153 |
| 3,481,430 | 12/1969 | Solomon | 182/153 |
| 4,085,762 | 4/1978 | O'Brian | 182/153 |
| 4,113,056 | 9/1978 | De Lorenzo | 182/153 |
| 4,238,001 | 12/1980 | Alexander | 182/153 |
| 4,403,678 | 9/1983 | Zieg | 182/153 |
| 4,429,765 | 2/1984 | Garcia | 182/153 |

FOREIGN PATENT DOCUMENTS

| | | | |
|---|---|---|---|
| 372618 | 5/1932 | United Kingdom | 182/153 |

*Primary Examiner*—Reinaldo P. Machado
*Attorney, Agent, or Firm*—Harvey B. Jacobson

[57] ABSTRACT

A folding and self-closing saw horse comprises a pair of trestle-like frames pivotally inconnected at their upper edges for opening and closing movement, and a folding brace assembly interconnecting the frames adjacent their lower edges for supporting the saw horse in an open position. The brace assembly comprises pivotally interconnected links which are connected to the respective frames by spring hinges which urge the frames toward one another when the brace assembly is folded. The saw horse may also include a table-like top piece connected by hinges to the respective frames.

6 Claims, 4 Drawing Figures

SELF-CLOSING SAW HORSE

FIELD OF THE INVENTION

This invention relates in general to folding saw horses, trestles, and the like, referred to hereinafter for convenience as saw horses. It is an overall object of the invention to provide an improved form of saw horse which is simple to set up, take down, transport and store, and which is made from readily available materials. More particularly, it is an object of the invention to provide a folding saw horse which is self-closing, at least to a degree, which does not tend to open once it is folded closed, and which when folded, can be stood on edge substantially in any convenient orientation in a stable manner.

DISCLOSURE STATEMENT

Applicant is aware of the following U.S. patents, the relevance of which is that they relate to folding saw horses and the like. None of the patents, however, discloses a saw horse having the features of the present invention.

U.S. Pat. No. 2,399,861 H. C. Evans—5-7-46
U.S. Pat. No. 2,427,679 C. 0. Larson—9-23-47
U.S. Pat. No. 3,045,777 E. L. Dintelmann—7-24-62
U.S. Pat. No. 3,481,430 F. K. Solomon—12-2-69
U.S. Pat. No. 4,085,762 O'Brien et al.—4-25-78
U.S. Pat. No. 4,113,056 DeLorenzo—9-12-78

SUMMARY OF THE INVENTION

In accordance with the invention, there is provided a folding and self-closing saw horse comprising a pair of trestle-like frames each having a transverse upper member, a transverse lower member, and diverging legs connected between the upper and lower members, hinge means pivotally interconnecting the upper members of the respective frames for folding movements to open and close the saw horse, and folding brace means connected between the respective lower members of the frames to support the saw horse in open position, wherein the brace means comprises a pair of links having a hinged elbow connection therebetween and spring hinges connecting the respective links to said lower members whereby folding of the elbow connection from an open position causes the spring hinges to urge the frames toward closed position.

The saw horse further may include an optional table-like top piece connected by hinges to the respective upper members of the frames, and the said upper members as well as the legs may have their upper edges cut at an angle so as to provide a flat support for the top piece when the saw horse is open. The bottom edges of the legs may be similarly cut. Also, the top piece and upper frame members may extend lengthwise to conform with the lengthwise dimension of the bottoms of the frames to enable the saw horse to stand freely on its sides when closed, as well as on its top and bottom.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
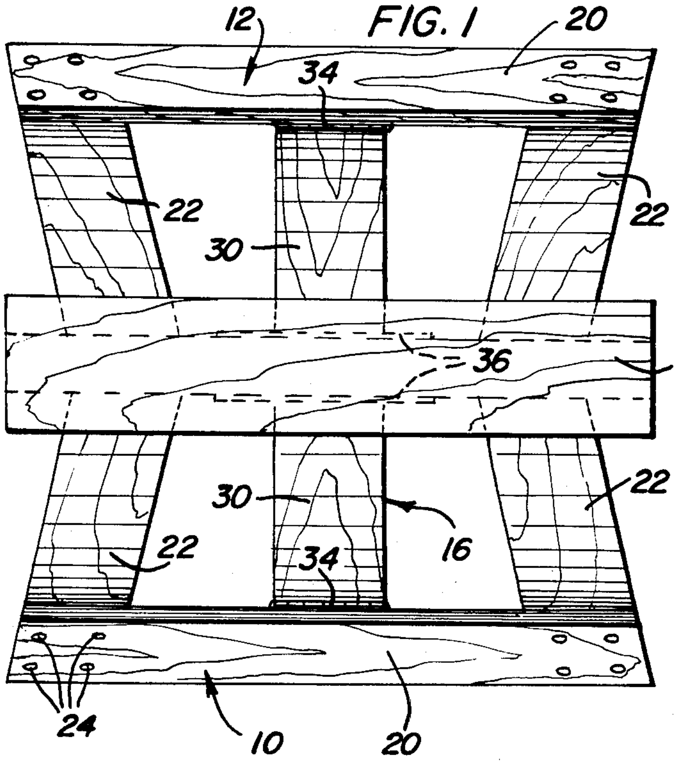
FIG. 1 is a plan view of a saw horse in accordance with the invention shown in open position.

The illustrated folding saw horse comprises a pair of left and right trestle-like frames 10 and 12, a table-like top piece 14, and a folding brace 16 connecting the frames.

Each of the frames 10 and 12 includes a horizontal upper member 18, a horizontal lower member 20, and diverging legs 22. These various structural elements may be made from like strips of wood plank material or the like of ladder grade which may be pressure treated. The upper members 18 are secured to the inner surfaces of the respective legs by suitable rivets, screws or like fasteners 24, and the lower members are secured to the outer surfaces of the respective legs by similar fasteners. At their upper edges 26, the respective upper members 18 of the frames are pivotally interconnnected for opening and closing movement by hinge means 28, which may comprise plural hinges or a single piano-type hinge.

The brace 16 serves to limit the degree of opening of the saw horse and to support same in open position. The brace comprises a pair of like links 30 which may be made from the same material as the frames, with a central hinge 32 connecting the links and forming en elbow joint therebetween. The outer ends of the respective links 30 are joined to the lower members 20 of the respective frames by spring hinges 34. Thus, when the elbow joint is fully extended, as in FIG. 2, the brace retains the saw horse in open position, but when the elbow joint is folded, the spring hinges 34 urge the saw horse toward the closed position shown in FIG. 4. When in this position, the spring hinges also provide resistance against opening of the saw horse.

Figure 2:
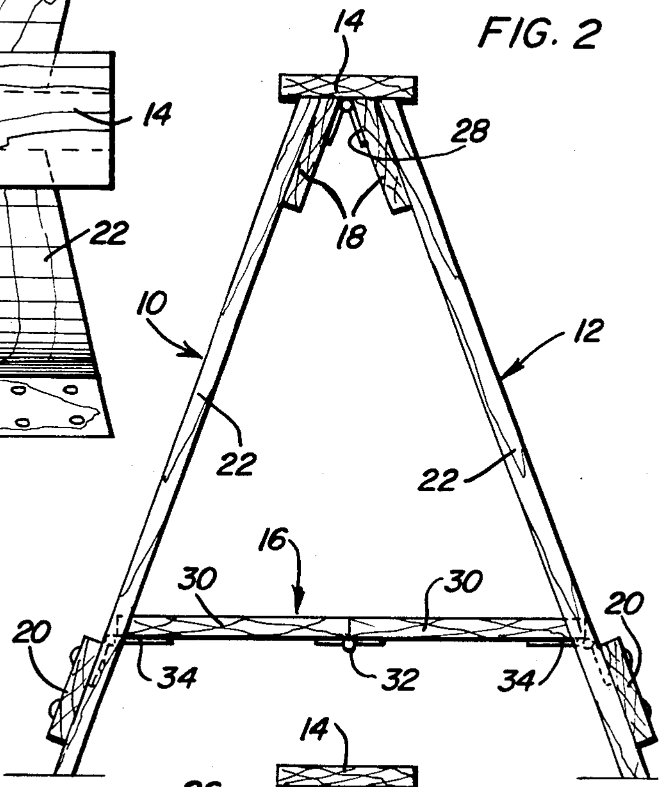
FIG. 2 is an end elevational view of the saw horse in the open position.
Figure 3:
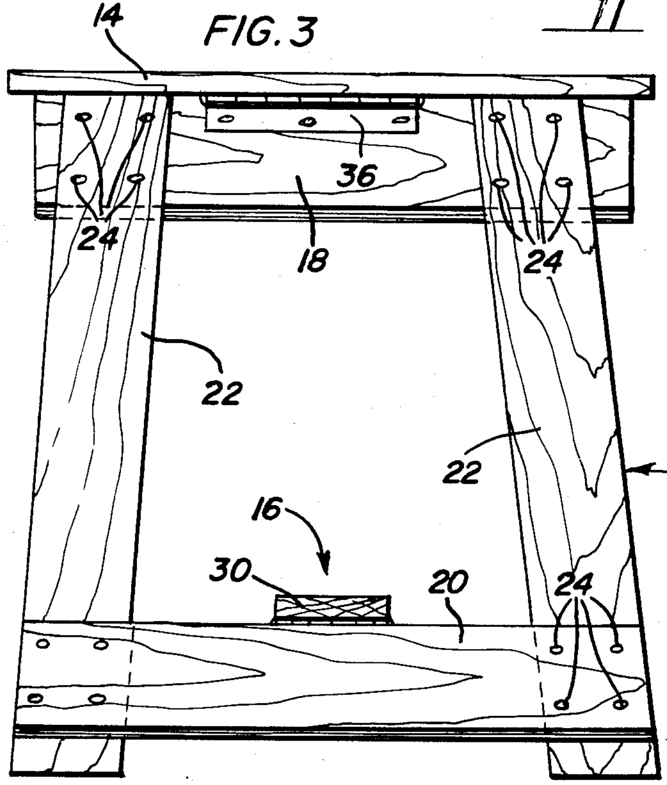
FIG. 3 is a side elevational view of the saw horse.
Figure 4:
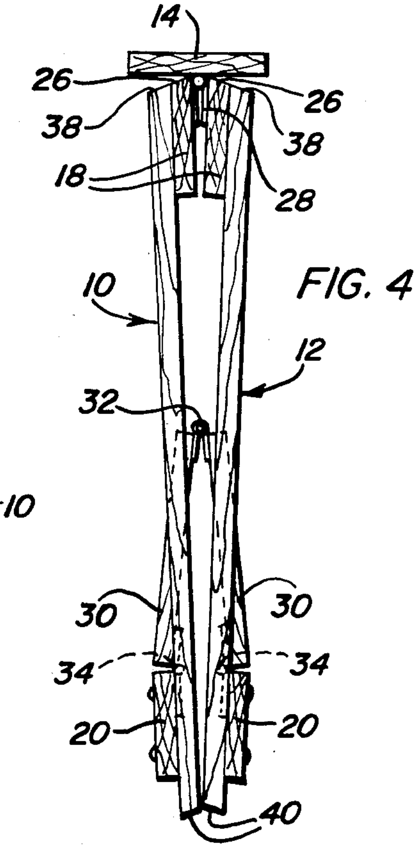
FIG. 4 is a view similar to FIG. 2 but showing the saw horse in closed position.

Top piece 14 is optional and may be connected to the respective upper members 18 of the frames by respective hinges 36 which allow unimpeded opening and closing of the frames while the top piece remains substantially horizontal. As best seen in FIG. 4, the upper edges 26 of the members 18 as well as the upper edges 38 of the legs are cut at an angle which is related to the degree of maximum opening of the frames, so that when fully open as shown in FIG. 2, the upper edges of the frames will provide a horizontal support surface for the top piece. The lower edges 40 of the legs are similarly cut at an angle. As seen in FIGS. 1 and 3, the lengthwise extent of the top piece 14 corresponds to the extent of the bottoms of the respective frames. Accordingly, when folded, the saw horse may stand freely on its top, bottom or sides.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A folding saw horse comprising a pair of trestle-like frames each having a transverse upper member, a transverse lower member, and diverging legs connected between the upper and lower members, hinge means pivotally interconnecting the upper members of the respective frames for folding movements to open and close the saw horse, and folding brace means connected between the respective lower members of the frames and located substantially centrally between the legs to support the saw horse in open position, wherein the brace means comprises a pair of links having a hinged elbow connection therebetween, and a spring hinge connected between each link and the respective lower frame member so that folding of the elbow connection from the open position of the saw horse causes the spring hinges to urge the frames toward a closed position.

2. The invention of claim 1 wherein the saw horse includes a table-like top piece connected by hinge means to the upper members of the respective frames.

3. The invention of claim 2 wherein upper edges of the respective frames are cut at an angle related to the degree of maximum opening of the saw horse so as to provide a horizontal support for the top piece when the saw horse is opened.

4. The invention of claim 2 wherein the top piece has a lengthwise extent substantially corresponding to the length of the frame bottoms so that when closed the saw horse can stand freely on its sides.

5. The invention of claim 1 wherein the upper members of the respective frames are connected to inner surfaces of the legs and the lower members of the respective frames are secured to the outer surfaces of the legs.

6. A folding saw horse comprising a pair of trestle-like frames, hinge means pivotally interconnecting the frames adjacent upper edges thereof for folding movements to open and close the saw horse, folding brace means interconnecting the frames adjacent lower edges thereof for supporting the saw horse in open position, the brace means comprising a pair of links having a hinged elbow connection therebetween, and a spring hinge connected between each link and the respective frame so that folding the elbow connection from the open position of the saw horse causes the spring hinges to urge the frames toward closed position, each frame comprising a transverse upper member, a transverse lower member, and diverging legs, the saw horse further including a table-like top piece, hinge means connecting the top piece to outer surfaces of each of the upper members of the frames, and the top piece having a length corresponding to a spacing between bottoms of the diverging legs to enable the saw horse, when folded, to stand on its sides.

* * * * *